United States Patent Office 2,889,168
Patented June 2, 1959

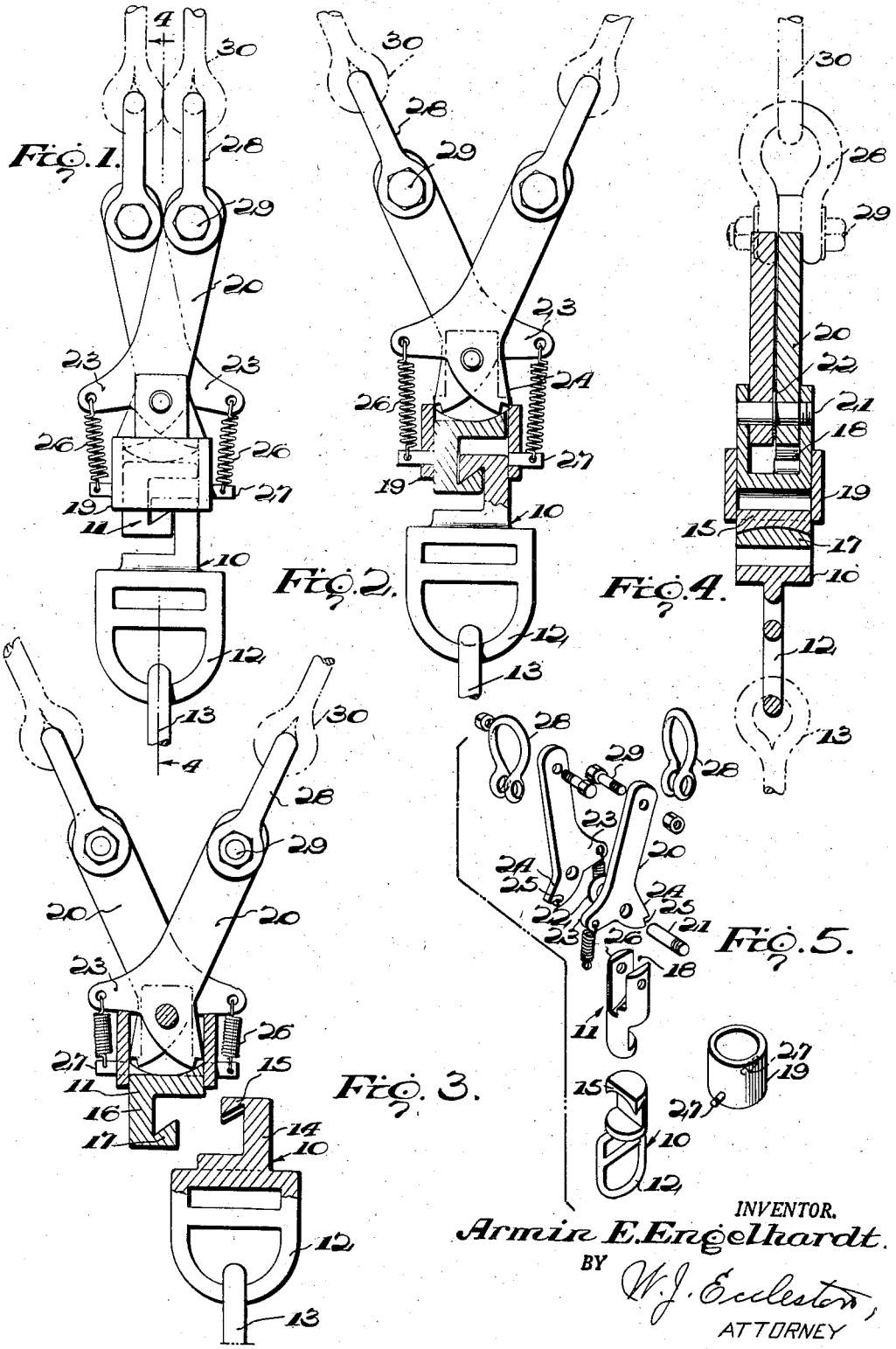

2,889,168

PARACHUTE ARMED DISCONNECT

Armin E. Engelhardt, Chicago, Ill., assignor to the United States of America as represented by the Secretary of the Army Application January 11, 1956, Serial No. 558,591

7 Claims. (Cl. 294—83)

(Granted under Title 35, U.S. Code (1952), sec. 266)

The invention described herein, if patented, may be manufactured and used by or for the Government for governmental purposes, without the payment to me of any royalty thereon.

The present invention relates to the dropping of loads to be lowered from aircraft by means of parachutes connected to the loads, and more particularly to means for disconnecting the loads from the parachutes.

In the dropping of loads by means of parachutes, it is important that the load be disconnected from the parachute immediately upon contact with the ground so that the load will not be dragged by the parachute. It is even more important however, that the load not be prematurely released, and do this end various delaying or safety timing devices have been employed to prevent release of the load from the parachute during the initial descent of the load. Such devices are usually complicated and often are not positive or entirely reliable in action, resulting at times in premature release and at other times preventing release after contact of the load with the ground.

An important object of the present invention is the provision of a safety device which is positively operated by the parachute when it becomes completely deployed, to set or arm the disconnect for automatic release of the load when it contacts the ground.

Another object of the invention is to provide a safety device of this character which is of simple construction, certain in operation and capable of withstanding rough usage without impairment of its operation.

Other objects and advantages of the invention will be apparent during the course of the following description.

In the accompanying drawings which form a part of this specification and wherein like characters of reference denote like parts throughout.

Figure 1 is a side elevation of the disconnect with the parts arranged in the safe position, Figure 2 is a similar view with parts being shown in section, the parts being shown at the point of arming, that is in transition between the safe and armed position, Figure 3 is a similar view illustrating the parts in the disconnect position, parts being shown in section, Figure 4 is a vertical sectional view taken on the line 4—4 of Figure 1, and Figure 5 is an exploded perspective of the components of the disconnect.

In the drawings, wherein for the purpose of illustration is shown a preferred embodiment of the invention, the numeral 10 designates a load-engaging hook element adapted to interengage with a load-supporting hook element 11. A depending ring 12 is formed on or carried by the lower end of the hook element 10 and the load is secured to said ring in any suitable manner, as at 13. The base of load-engaging hook element 10 may be of any suitable shape but preferably is round as shown, and the body of the upper load-supporting hook element is of the same cross-sectional shape and size. The hook element 10 is cutaway for substantially two-thirds of its width or diameter, leaving an upstanding edge post 14, and an overhanging hook portion 15 projecting inwardly therefrom at a point spaced a substantial distance above the base of element 10. The hook portion 15 is undercut as best seen in Figures 2 and 3, and is also provided with a concave undersurface from side to side of the hook portion as illustrated in Figures 4 and 5. The load-supporting element 11 is similarly provided with a depending edge post 16 and a lower hook portion 17 but the hook 17 while similarly undercut is provided with a convex surface to engage and complement the concave surface of hook 15, as illustrated in Figure 4. The spaces between the hooks 15 and 17 and their respective bases or body portions are substantially greater than the thickest portions of the hooks 15 and 17 so that when the two hook members 10 and 11 are moved towards each other their hooks 15 and 17 will be free to separate laterally as illustrated in Figure 3. The complementary curved meeting surfaces of hooks 15 and 17 are designed to present separation by relative sliding movement in a direction lengthwise of the hooks 15 and 17 which might otherwise be brought about by swaying of the load during its descent. Obviously, any other means of attaining this end may be employed, such as any substantially complementary departure from a plane meeting surface, side flanges or the like.

The body of the upper load supporting hook element is round in cross-section and extends a substantial distance above the hook 17 and edge post 16, being slotted centrally of its upper end at 18. When the hooks 15 and 17 are interengaged as in Figures 1, 2, and 4, the elements 10 and 11 combine to form a generally cylindrical member which is adapted to be received within a snugly fitting safety interlock or sleeve 19, slidable up and down on element 11 to encircle the upper portion of lower hook element 10 when moved downwardly. When the sleeve is moved to its upper position shown in Figure 3, it is above and out of engagement with lower hook element 10 so that such hook element can be readily disengaged from the upper hook element 11. On the other hand, when the sleeve is moved downwardly to its lower or safe position illustrated in Figure 1, it surrounds the upper end of element 10 and prevents disengagement of the elements 10 and 11.

A pair of safety operating arms 20 are journaled adjacent their lower ends within the slot 18 by means of a removable transverse pin 21 carried by the upper end of element 11. A washer 22 is arranged on pin 21 between the arms 20 to permit free movement of the arms in opposite directions without binding. Each of the arms is forked at its lower end to provide a substantially horizontal laterally extending lever 23 and a depending foot 24 inclined away from the lever 23. The lower end of each foot 24 acts as a detent and is notched at 25 to receive the top inner edge of the safety sleeve 19. The two arms 20 are oppositely arranged so that the levers 23 project outwardly on opposite sides of the hook element 11. Coil springs 26 connect the outer portions of levers 23 with outstanding lugs 27 carried by the sleeve 19 adjacent its lower end, and urge the sleeve upwardly to its inoperative or armed position.

The upper ends of arms 20 are secured to clevises or the like 28 by means of bolts 29, and risers 30 connect each clevis with one-half of the shroud lines of the parachute (not shown). In the safe position of the device, the arms 20 are together as seen in Figure 1, and the clevises 28 and risers 30 are disposed in proximity and in substantial parallel relation, as illustrated. During the no-load initial period of the drop before the parachute fills with air, the arms 20 and risers 30 will maintain this position, but when the parachute fills with air and reaches full deployment, the shroud lines and risers are separated and serve to pull the arms 20 into the diverging position illustrated in Figure 2. This spreading action of the shroud lines and risers incident to full deployment of the parachute is well known and is fully illustrated and described in my pending patent application Serial Number 558,594 for Parachute Controlled Disconnect filed concurrently herewith, such application containing claims to means operated by such divergence of the shroud lines to arm a disconnect, without regard to the particular form of the disconnect. As such claims are generic to the present invention, such broad aspect of the device is not claimed herein.

In operation, the hook elements 10 and 11 are interengaged, the sleeve 19 is pulled downwardly to surround the top of the lower element 10, and the arms 20 are brought together thereby moving the notched ends of feet 24 outwardly into the path of sleeve 19 which is allowed to move upwardly into notches 25 as seen in Figure 1. The tension of coil springs 26 maintains the sleeve in engagement with the notches 25 and the feet 24 prevent further upward movement of the sleeve. The clevises and bolts prevent movement of the arms past each other so that the sleeve is firmly held in its safe position encircling the top of element 10 and preventing removal of element 10 from engagement with element 11. This safe position of the parts is maintained throughout the no-load period of the drop. When the parachute fills with air and reaches full deployment the weight of the load is transmitted to the risers and shroud lines which are pulled apart, thereby pulling arms 20 apart. The initial separating movement of the arms is resisted by the coil springs 26 because as the feet 24 are swung inwardly and downwardly by movement of the arms about the journal pin 21, sleeve 19 must be moved downwardly by the walls of foot notches 25 until the outer ends of feet 24 move inwardly of the inner periphery of the sleeve. Figure 2 shows this position of the parts at the moment of arming, namely when the feet 24 have just moved inwardly sufficiently to clear the inner edge of the sleeve, at which time the coil springs 26 act to instantly snap the sleeve upwardly to its inoperative or armed position above the top of hook element 10, the lower edges of levers 23 serving as stops to engage the top of the sleeve and prevent its further upward movement. During the rest of the descent of the parachute, the weight of the load will maintain the hook elements 15 and 17 in operative engagement. When the load contacts the grounds or other support, its weight will be removed from the elements 10 and 11 which will then be free to fall apart as illustrated in Figure 3.

The coil springs 26 perform the dual function of urging the safety sleeve 19 towards its inoperative position and also maintaining the safe or operative position of the sleeve by resisting initial separation of the arms 20. Due to this latter action of the spring, the disconnect will be maintained in safe position during handling and loading aboard the aircraft, as well as during the initial no-load period of the drop. The hook elements 10 and 11, and the safety sleeve 19 may be of some shape other than circular, and hooks 15 and 17 may have some cross-sectional shape other than that shown. The size and strength of the various parts will depend upon the weight of the load to be dropped, and the amount of pull necessary to separate the arms 20 can be varied by varying the strength of coil springs 26.

While I have shown and described the preferred embodiment of the invention, it is to be understood that various changes in the form and arrangement of parts may be resorted to without departing from the spirit of the invention or the scope of the subjoined claims.

I claim:

1. In a parachute disconnect for automatically releasing a parachute from its load when the load contacts the ground, upper and lower interengaging hook elements connected respectively to the parachute and to the load, said elements being so constructed and arranged that they are normally held in engagement by the weight of the load and disengaged by release from the weight of the load, an arming device comprising a safety interlock carried by one of the hook elements and movable with respect to said elements from an operative safety position in which it engages both elements to prevent their disengagement to an inoperative position out of engagement with one of said elements to permit their disengagement, and means connected to the parachute and operated immediately in response to the full deployment of the parachute to move the safety interlock to its inoperative position.

2. In a parachute disconnect for automatically releasing a parachute from its load when the load contacts the ground, a pair of interengaging hook elements connected one to the parachute and the other to the load, said elements being so constructed and arranged that they are normally held in engagement by the weight of the load and disengaged by release from the weight of the load, an arming device comprising a safety sleeve movable with respect to said elements from an operative safe position in which it surrounds a portion of both elements to lock them in engagement to an inoperative position in which it surrounds only one element to permit their disengagement and means connected to the parachute and operated immediately in response to the full deployment of the parachute to move the safety sleeve from its operative to its inoperative position.

3. In a parachute disconnect for automatically releasing a parachute from its load when the load contacts the ground, a pair of interengaging hook elements connected respectively to the parachute and to the load, said elements being normally held in engagement by the weight of the load, a safety sleeve movable from an operative safe position in which it surrounds a portion of both of said elements for preventing their disengagement to an inoperative armed position in which it surrounds only one of said elements to permit their disengagement, said sleeve being normally urged towards its inoperative position, detent mechanism movable from an operative safe position in engagement with the sleeve to an inoperative position, and means connected to the parachute and operated by the forces exerted by full deployment thereof to move the detent mechanism to its inoperative position.

4. In a parachute disconnect for automatically releasing a parachute from its load when the load contacts the ground, upper and lower interengaging hook elements connected respectively to the parachute and to the load, said elements being so constructed and arranged that they are normally held in engagement by the weight of the load and disengaged by release from the weight of the load, an arming device comprising a safety sleeve movable with respect to said elements from an operative safe position in which it surrounds a portion of both elements for preventing their disengagement to an inoperative armed position in which it surrounds only one of the elements to permit their disengagement, said sleeve being normally urged towards its inoperative position, detent mechanism movable from an operative safe position in engagement with the sleeve to an inoperative position, resilient means operative to resist movement of the detent mechanism to its inoperative position, and means connected to the parachute and operated by full deployment thereof to move the detent mechanism to its inoperative position against the tension of said resilient means.

5. In a parachute disconnect for automatically releasing a parachute from its load when the load contacts the ground, upper and lower interengaging hook elements connected respectively to the parachute and to the load, said elements being normally held in engagement by the weight of the load, an arm journaled for rotation in the upper hook element, a safety sleeve movable from an operative safe position in which it surrounds a portion of both hook elements for preventing their disengagement to an inoperative armed position in which it surrounds only the upper hook element to permit disengagement of the two hook elements, resilient means connecting the arm to the sleeve and normally urging the sleeve towards its inoperative position, and a detent carried by the arm and engaging the sleeve in the safe position of the arm and sleeve to maintain the sleeve in its operative position against the tension of the resilient means, said arm being operatively connected to the parachute so that upon full deployment of the parachute the arm will be moved about its journal to move the detent out of engagement with the sleeve and permit movement of the sleeve to its inoperative position under action of the resilient means.

6. In a parachute disconnect for automatically releasing a parachute from its load when the load contacts the ground, upper and lower interengaging hook elements connected respectively to the parachute and to the load, said elements being normally held in engagement by the weight of the load, a pair of arms journaled for rotation in the upper hook element, a safety sleeve movable from an operative safe position in which it surrounds a portion of both hook elements for preventing their disengagement to an inoperative armed position in which it surrounds only the upper hook element to permit disengagement of the two hook elements, resilient means connecting each arm to the sleeve and normally urging the sleeve towards its inoperative position, a detent carried by each arm below its journal and engaging the sleeve in the safe position of the arms and sleeve to maintain the sleeve in its operative position against the tension of the resilient means, and means operatively connecting the arms to the parachute at points above their journal so that upon full deployment of the parachute the arms will be moved about their journal to move the detents out of engagement with the sleeve and permit movement of the sleeve to its inoperative position under action of the resilient means.

7. In a parachute disconnect for automatically releasing a parachute from its load when the load contacts the ground, a pair of interengaging hook elements connected one to the parachute and the other to the load, said hook elements having undercut and laterally curved complementary meeting surfaces normally held in engagement by the weight of the load, a safety sleeve movable from an operative safe position in which it surrounds a portion of both hook elements to an inoperative position in which it surrounds only one element, and means connected to the parachute and operated by full deployment thereof to move the safety sleeve from its operative to its inoperative position.

References Cited in the file of this patent
UNITED STATES PATENTS

| | | |
|---|---|---|
| 2,444,919 | Cotton et al. | July 13, 1948 |
| 2,483,044 | Gongwer | Sept. 27, 1949 |
| 2,517,361 | Staats | Aug. 1, 1950 |
| 2,521,516 | Heidman et al. | Sept. 5, 1950 |
| 2,682,425 | Staats | June 29, 1954 |